United States Patent

Uesugi et al.

Patent Number: 5,425,037
Date of Patent: Jun. 13, 1995

[54] DATA TRANSMISSION APPARATUS

[75] Inventors: Mitsuru Uesugi; Kazuhisa Tsubaki; Kouichi Honma, all of Yokohama, Japan

[73] Assignee: Matsushita Electric Industrial Co., Ltd., Osaka, Japan

[21] Appl. No.: 840,164

[22] Filed: Feb. 24, 1992

[30] Foreign Application Priority Data

Mar. 7, 1991 [JP] Japan .................. 3-041715

[51] Int. Cl.$^6$ .......................................... G06F 11/10
[52] U.S. Cl. ........................................ 371/43; 375/341
[58] Field of Search .................. 371/43, 30, 44, 45, 371/46; 375/76, 94,

[56] References Cited

U.S. PATENT DOCUMENTS

| | | | |
|---|---|---|---|
| 4,309,772 | 1/1982 | Kloker et al. | |
| 4,322,848 | 3/1982 | Snyder, Jr. | |
| 4,945,549 | 7/1990 | Simon et al. | 375/53 |
| 5,157,694 | 10/1992 | Iwasaki et al. | 375/81 |
| 5,159,608 | 10/1992 | Falconer et al. | 375/1 |
| 5,173,926 | 12/1992 | Iwasaki | 371/43 |
| 5,193,102 | 3/1993 | Meidan et al. | 375/1 |
| 5,204,874 | 4/1993 | Falconer et al. | 375/1 |
| 5,208,816 | 5/1993 | Seshardi et al. | 371/43 |
| 5,229,767 | 7/1993 | Winter et al. | 341/50 |
| 5,271,042 | 12/1993 | Borth et al. | 371/43 |
| 5,321,725 | 6/1994 | Paik et al. | 375/39 |
| 5,351,249 | 9/1994 | Lomp et al. | 371/43 |

FOREIGN PATENT DOCUMENTS 0465428  1/1992  European Pat. Off. .

Primary Examiner—Robert W. Beausoliel, Jr.
Assistant Examiner—Albert Decady
Attorney, Agent, or Firm—Stevens, Davis, Miller & Mosher

[57] ABSTRACT

A data transmission apparatus with an improved error-rate characteristic after soft decision decoding by improving a decoder input such that, according to an embodiment, digital data such as voice data transmitted after being applied with coding and modulation are received, and are demodulated by a demodulator as a working mode thereof. A square mean value of errors is obtained by an error calculator on a demodulator output, and $$(1-e^{-2x/\sigma^2})/(1+e^{-2x/\sigma^2})$$

is computed by a likelihood calculator and adopted as a decoder input.

4 Claims, 3 Drawing Sheets $$Y = \frac{1-e^{-2x/\sigma^2}}{1+e^{-2x/\sigma^2}}$$

DATA TRANSMISSION APPARATUS

BACKGROUND OF THE INVENTION

The present invention relates to a data transmission apparatus utilized in a digital mobile radio communication equipment and the like.

FIG. 1 is a diagram showing a structure of a conventional data transmission apparatus. In FIG. 1, a reference numeral 1 represents a signal source for outputting transmission data such as voice data, 2 represents an encoder performing error coding on the above-mentioned transmission data, 3 represents a modulator for modulating the transmission data into signals for transmission, and 4 represents a transmitting antenna for radiating transmission signals. 5 represents a receiving antenna for receiving transmission signals, 6 represents a demodulator for demodulating received signals, 7 represents an amplitude limiter for limiting the amplitude of received signals and 8 represents a decoder for obtaining decoded data.

Next, the operation of the above-mentioned conventional example will be described. In FIG. 1, the digital data outputted from the signal source 1 are code-converted by error correction coding such as convolutional coding in the encoder 2, applied with modulation such as frequency-shift keying (FSK) and phase-shift keying (PSK) by the modulator 3, and transmitted from the transmitting antenna 4. The transmitted signals are received by the receiving antenna 5 and demodulated by the demodulator 6. Here, a value at an identification point is outputted as it is from the demodulator 6 as a demodulator output X. In the amplitude limiter 7, in order to perform decoding using Euclidean distance such as Viterbi decoding (which means correction of errors produced in a transmission line by releasing coding coded in the encoder 2) with soft decision by the decoder 8, a demodulator output X is limited within a range from 1 to −1 as shown in FIG. 2 so as to be inputted to the decoder 8 as a decoder input Y. The output of the decoder 8 is processed as decoded data.

In the above-mentioned conventional data transmission apparatus, it is possible to correct bit errors in digital signals by coding with the encoder and decoding with the decoder and decoding is performed in the decoder with soft decision. Thus, there is an advantage that error correction capacity is also higher as compared with a case of hard decision.

In the above-mentioned data transmission apparatus, however, it is only made to limit the demodulator output X as the decoder input Y by the amplitude limiter 7 between 1 and −1. Accordingly, the error rate characteristic is improved when soft decision is made by the decoder 8 as compared with a case of hard decision, but the effects of soft decision cannot be produced satisfactorily.

SUMMARY OF THE INVENTION

It is an object of the present invention to provide an excellent data transmission apparatus having the data given to a decoder be able to demonstrate the maximum of the effect of soft decision probability-wise.

According to the present invention, in order to achieve the above-mentioned object, an error computer and a likelihood calculator are provided after the demodulator, thereby to convert the data given to the decoder so as to obtain the maximum of the effect of soft decision probability-wise.

Therefore, according to the present invention, a decoder input producing the maximum of the effect of soft decision decoding is obtainable probability-wise and the error correction capacity in the decoder is increased by using the error calculator and the likelihood calculator, thus making it possible to improve the error rate characteristic for the decoded data.

DESCRIPTION OF THE PREFERRED EMBODIMENTS

Figure 1:
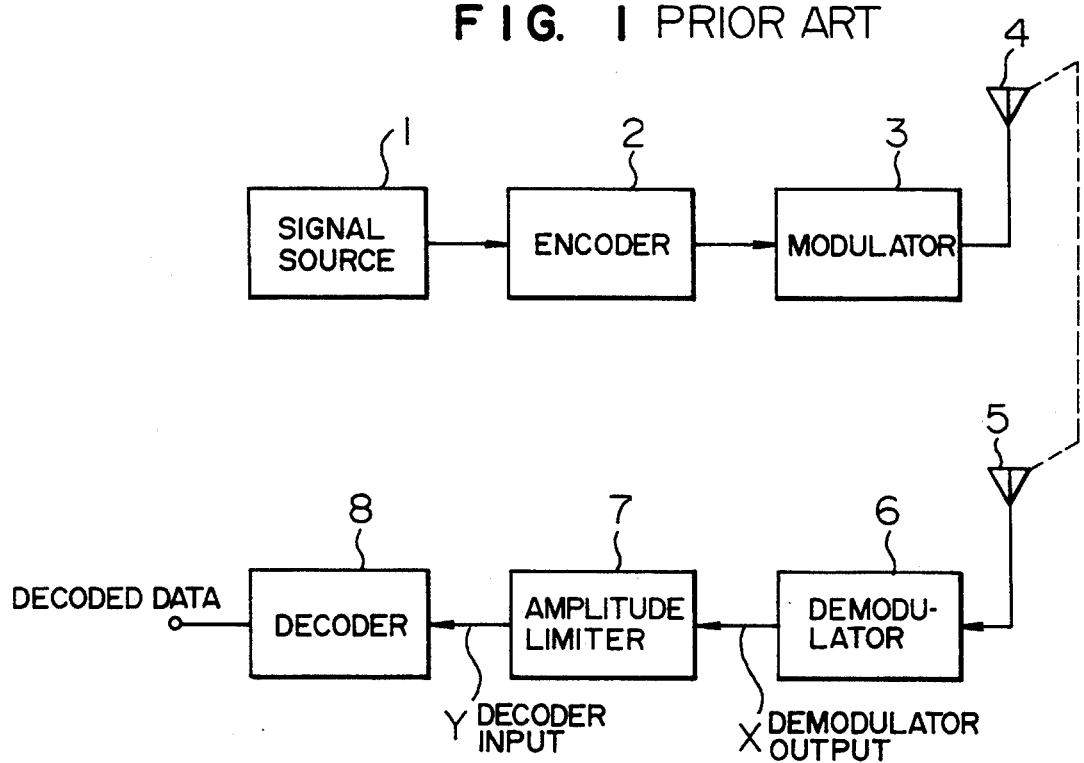
FIG. 1 is a schematic block diagram showing a structure of a conventional data transmission apparatus.
Figure 2:
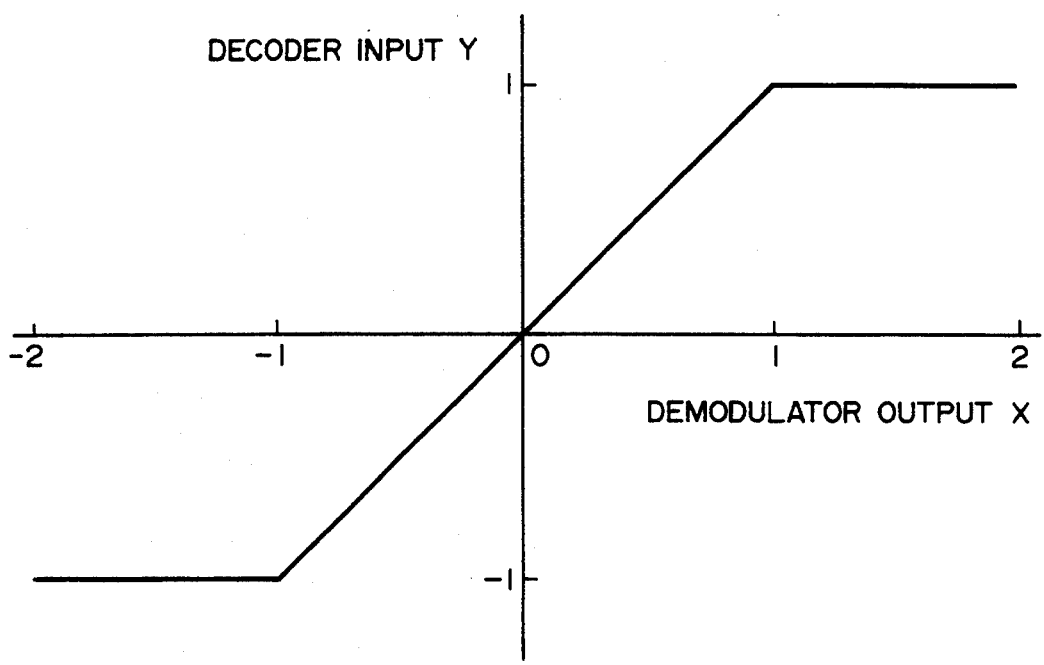
FIG. 2 is a graph showing a method of calculation in an amplitude limiter in a conventional data transmission apparatus.
Figure 3:
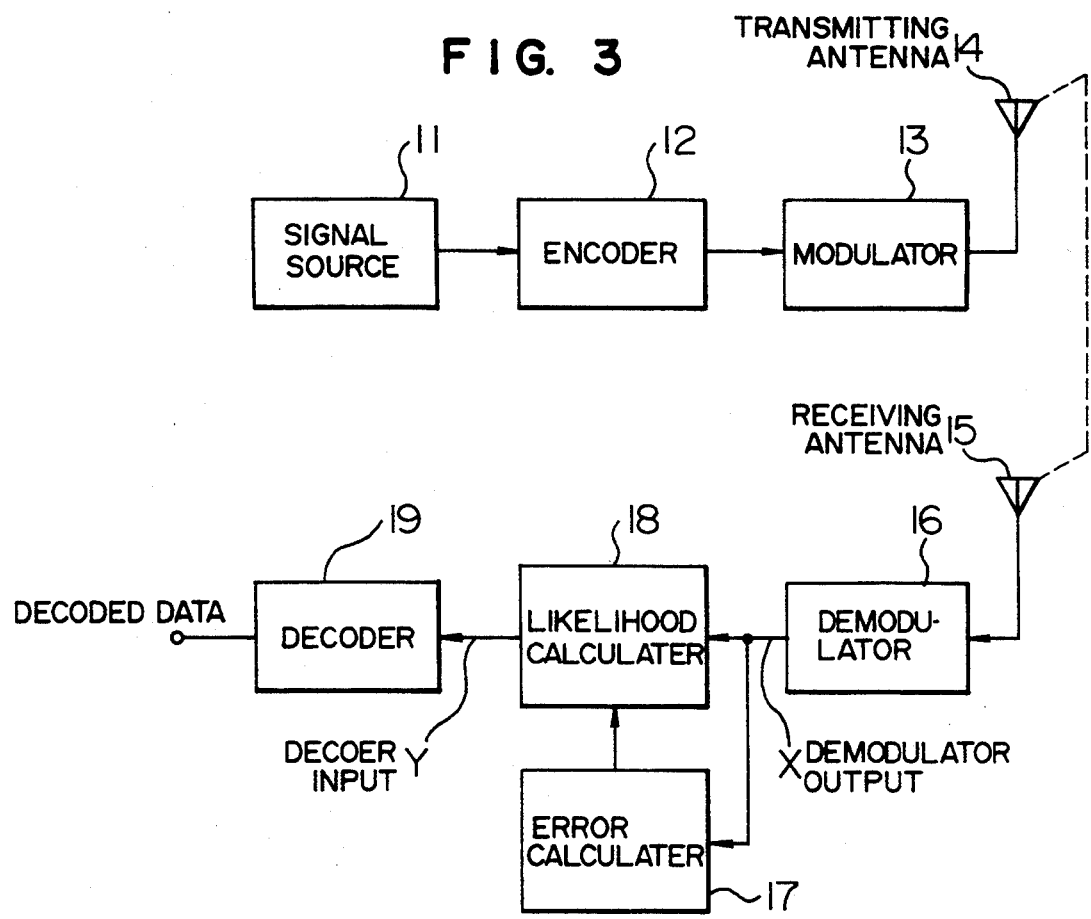
FIG. 3 is a schematic block diagram of a data transmission apparatus according to the present invention.

FIG. 3 is a diagram showing a structure of an embodiment of the present invention. In FIG. 3, a reference numeral 11 represents a signal source for outputting transmission data such as voice data, 12 represents an encoder performing error coding on the transmission data, 13 represents a modulator for modulating the transmission data into codes for transmission, and 14 represents a transmitting antenna radiating the transmission signals. Further, 15 represents a receiving antenna for receiving the transmitted signal, 16 represents a demodulator for demodulating the received signal, 17 represents an error calculator for calculating a mean square of errors against the output of the demodulator 16, 18 represents a likelihood calculator calculating for making the effect of soft decision decoding the maximum probability-wise, and 19 represents a decoder for obtaining decoded data.

Figure 5:
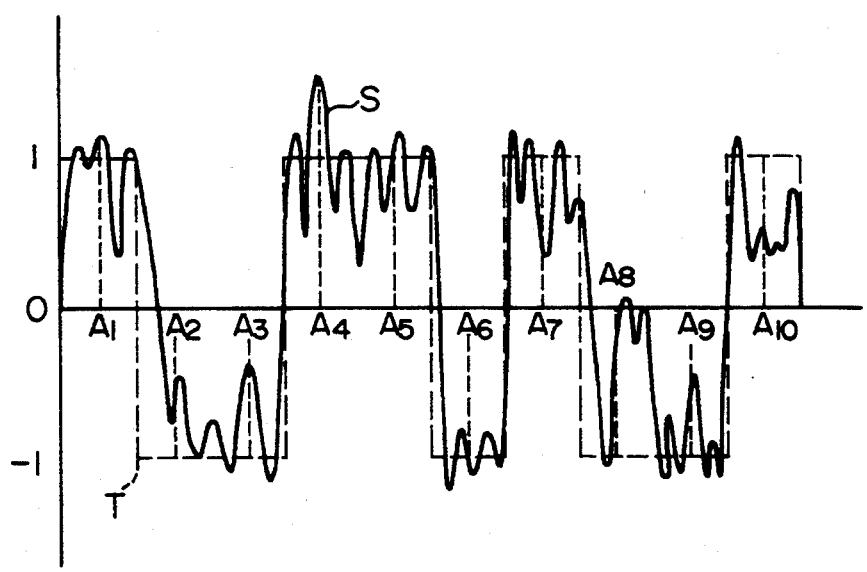
FIG. 5 is a diagram showing signals in one frame in the present invention.

In the next place, the operation of the above-mentioned embodiment will be described. In the above-mentioned embodiment, the digital data outputted from the signal source 11 are code-converted by error correction coding such as convolutional coding in the encoder 12, applied with modulation such as FSK and PSK in the modulator 13, and transmitted from the transmitting antenna 14. The transmitted signal is received by the receiving antenna 15 and demodulated by the demodulator 16. FIG. 5 shows an example of the waveform of a signal in one frame. A waveform T shown with a broken line shows the output of the modulator 13, and a waveform S shown with a continuous line shows a signal when the signal shown with the waveform T is transmitted and inputted to the demodulator 16 through a transmission line.

Figure 4:
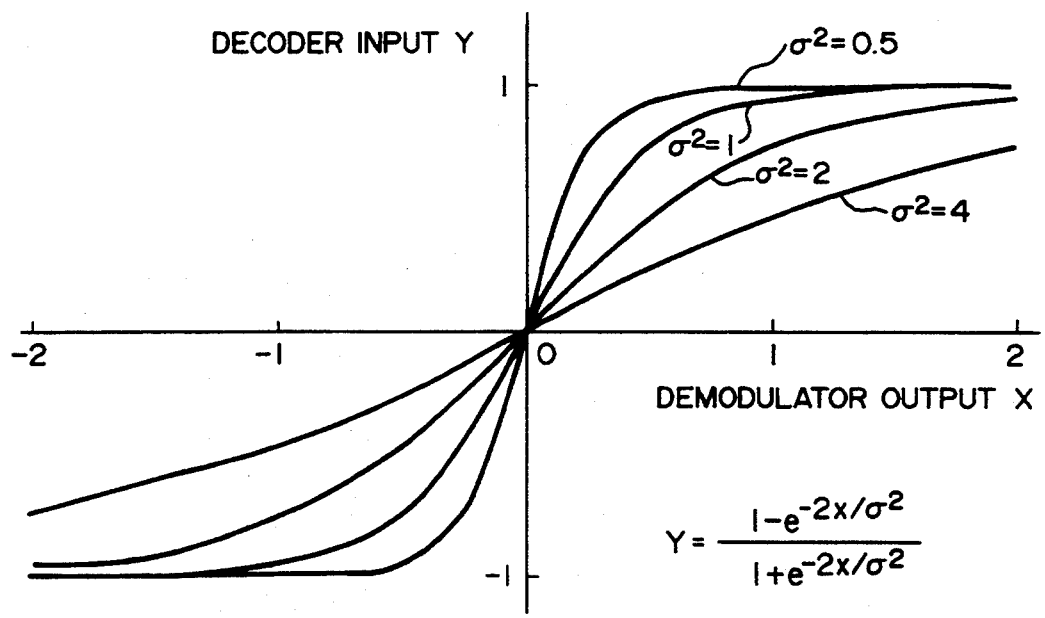
FIG. 4 is a graph showing a method of calculation in a likelihood calculator of the apparatus.

Here, values at identification points ($A_1, A_2, \ldots, A_{10}$ shown in FIG. 5) are outputted as they are from the demodulator 16 at each of these identification points as the demodulator output X, respectively. In the error calculator 17, the demodulator output is decided to be 1 in case it is larger than 0 and to be −1 in case it is smaller than 0, and square mean value $\sigma^2$ of the difference between the value (1 or −1) and the demodulator output X is calculated for every one frame,, On the other hand, the likelihood calculator 18 computes the likelihood at each identification point against the demodulator output X on the basis of the square mean value $\sigma^2$ obtained by the error calculator 17, and outputs a decoder input Y as shown in FIG. 4. In the decoder 19, soft decision decoding such as Viterbi decoding is performed using this decoder input Y, thereby to correct errors produced in the transmission line.

Next, a method of computation in the likelihood calculator 18 will be described while referring to FIG. 4 and FIG. 5. When transmission is performed without distortion, the demodulator output X maintains the waveform T as it is and always shows 1 or −1 because of digital transmission. However, in case the signal which should be at 1 practically shows Gaussian distribution with 1 as the center in the demodulation output X due to distortion, noise and the like in the transmission line, the probability that the demodulator output becomes x from 1 is expressed as:

$$P_1(x) = \frac{1}{\sqrt{2\pi} \cdot \sigma} \cdot e^{-(x-1)^2/2\sigma^2}$$

Further, the probability that the demodulator output X becomes x from −1 is expressed as:

$$P_{-1}(x) = \frac{1}{\sqrt{2\pi} \cdot \sigma} \cdot e^{-(x+1)^2/2\sigma^2}$$

When the probability at 1 to 0 that x is at 1 is made to correspond to the amplitude values 1 to −1 in case the demodulator output x is at x, the probability is expressed as:

$$P(x) = \frac{2P_1(x)}{P_1(x) - P_{-1}(x)} - 1 = \frac{1 - e^{-2x/\sigma^2}}{1 + e^{-2x/\sigma^2}}$$

This probability shows how close to 1 or −1 the demodulator output x is, and this value becomes the decoder input Y at each identification point.

Now, if the distance from such probability is set to the Euclidean distance when soft decision is made by the decoder 19, the highest effect of error correction in decoding is obtainable probability-wise.

Further, if $\sigma^2$ changes when interleaving is performed in coding the output from the signal source, the decoder input Y is different even for the same demodulator output X, and the amplitude of that which has smaller $\sigma^2$, i.e., that which has smaller noise or distortion becomes larger. Accordingly, it is possible to make the effect of soft decision of the decoder 19 the highest probability-wise thereby to improve the error rate characteristic by outputting the decoder input Y as shown in FIG. 4 by means of the error calculator 17 and the likelihood calculator 18 with the demodulator output X.

Further, since the absolute value of the decoder input Y becomes large against the same demodulator output X as compared with a case that the square mean value of errors is large if above-described square mean value of errors is small, it is possible to further increase the effect of interleaving.

The modulator and the demodulator shown in the above embodiment may be formed, for example, by SL1640C (or SL1641C) and SL6639 respectively manufactured by GEC PLESSEY SEMICONDUCTORS, and functions of other block elements may be achieved by program controlled DSP (digital signal processor), for example.

We claim:
1. A data transmission apparatus, comprising:
   (a) a transmitting side which comprises:
      (i) an encoder for performing error correction coding on data to be transmitted and for outputting coded data;
      (ii) a modulator for modulating said coded data into a signal for transmission; and
      (iii) a transmitting means for transmitting said signal; and
   (b) a receiving side which comprises:
      (i) a receiving means for receiving said signal;
      (ii) a demodulator for demodulating said signal to produce a demodulated signal;
      (iii) an error calculator for calculating a square mean value of errors with respect to 1 or −1 in the demodulated signal;
      (iv) a likelihood calculator for calculating a likelihood which equals

$$(1-e^{-2x/\sigma^2})/(1+e^{-2x/\sigma^2}),$$

where $\sigma$ is said square mean value; and
      (v) a decoder for obtaining decoded data by performing soft decision decoding on a decoder input signal obtained in accordance with said demodulated signal and said likelihood.

2. A data transmission apparatus according to claim 1, wherein said error correction coding comprises convolutional coding.

3. A data transmission apparatus according to claim 1, wherein said soft decision decoding comprises Viterbi decoding.

4. A data receiving apparatus comprising:
   (a) a demodulator for demodulating data to which error correction coding has been applied and for outputting demodulated data;
   (b) an error calculator for calculating a square mean value of errors with respect to 1 or −1 in the demodulated data;
   (c) a likelihood calculator for obtaining a likelihood in accordance with said square mean value and outputting a decoder input signal obtained in accordance with the demodulated data and said likelihood; and
   d) a decoder for obtaining encoded data by performing soft decision decoding on said decoder input signal;
   wherein said square mean value equals $\sigma$, and wherein said likelihood equals $(1-e^{-2x/\sigma^2})/(1+e^{-2x/\sigma^2})$.

* * * * *